United States Patent Office 3,507,022
Patented Apr. 21, 1970

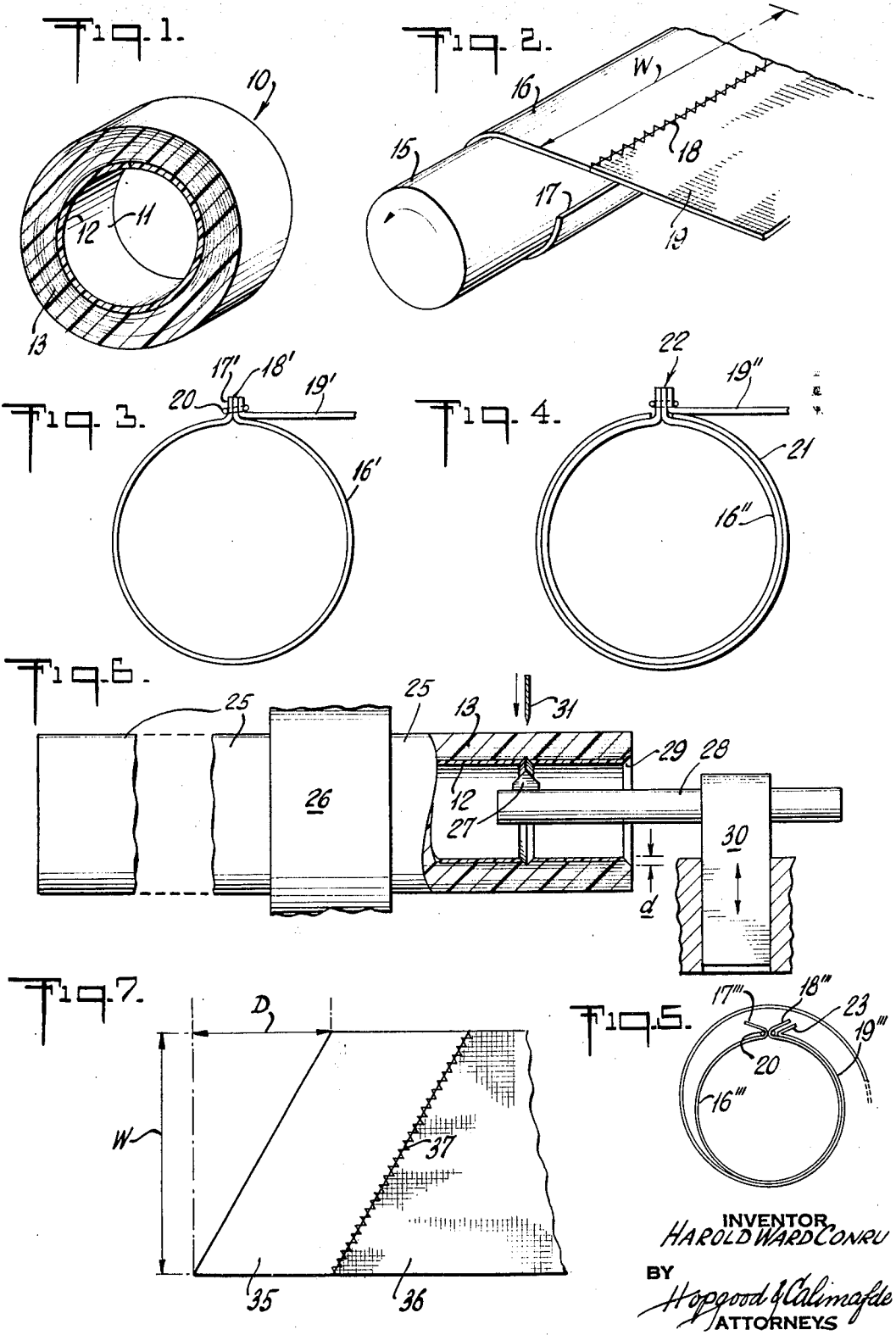

3,507,022
PLASTIC IMPREGNATED FABRIC JOURNAL
BEARING
Harold Ward Conru, South Burlington, Vt., assignor, by mesne assignments, to Textron Inc., Providence, R.I., a corporation of Delaware
Filed Feb. 7, 1968, Ser. No. 703,702
Int. Cl. B23p 11/00, 17/00
U.S. Cl. 29—149.5                    15 Claims

ABSTRACT OF THE DISCLOSURE

The invention contemplates an improved method of making fabric-lined journal bearings, of bore size determined by a mandrel. A piece of low-friction fabric material is cut from rectilinear stock, to such length between cut-off ends as to substantially equal the peripheral extent of the mandrel. A piece of bondable fabric is secured, as by sewing or clamping, to a cut-off end of the low-friction piece. The fabric composite, impregnated with hardenable material, is then wrapped onto the mandrel, beginning with the low-friction piece. The assembly is thereafter cured to hardness, and the mandrel removed.

---

This invention relates to a method of making a journal bearing in which low-friction fabric material is relied upon to achieve low-friction at the bore of the bearing.

In the field of plastic bearings wherein reliance is placed on low-friction properties in certain synthetic fibers to achieve low friction in bearing operation, it is known to rely on composite or double-woven fabric in which two different materials are woven together, namely, a low-friction material such as fibrous polytetrafluoroethylene (Teflon), and a bondable material such as cotton, linen, fiberglass, or the like. The fabric is impregnated with phenolic, epoxy or other hardenable material and is then cured to hardness in the desired shape. The fabric is woven so as to expose the low-friction fibers at the bearing face, when molded or otherwise shaped.

In using such materials for journal bearings, a strip of the fabric is impregnated with the hardenable material and then wrapped on a mandrel to desired build-up thickness, as a spiral development about the mandrel. Although this technique is effective in terms of technical proficiency of the ultimate product, it is unnecessarily wasteful of the low-friction fiber. Proposals have been made to save the low-friction fiber by specially weaving a cloth so as to incorporate the low-friction material near one edge, to a width adequate for peripheral coverage of a given sized mandrel; but this technique requires costly weaving set-ups, wherein different-width edges must be woven for each journal-bearing bore size to be accommodated.

It is, accordingly, an object of the invention to provide an improved method of making a journal bearing of the character indicated, wherein the utmost economy of low-friction material can be realized, without sacrifice to operational proficiency.

Another object is to achieve the foregoing object with a method inherently flexibly lending itself to use of the same woven fabrics for manufacture of journal bearings of a wide variety of bore and of outside diameter sizes.

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

FIGURE 1 is a simplified view in perspective showing a journal bearing of the invention, the exposed end face being shown cut and in section to better illustrate relationships;

FIG. 2 is a perspective to illustrate steps of a first embodiment of the method of the invention;

FIGS. 3 and 4 are enlarged views in side elevation to illustrate alternatives;

FIG. 5 is a view similar to FIGS. 3 and 4, on a reduced scale, to illustrate a further alternative, the parts being shown loosely developed in order to avoid ambiguity of identification;

FIG. 6 is a simplified view in longitudinal elevation, partly broken-away and in section, to illustrate cut-off to desired length; and FIG. 7 is a flat layout of patterns usable in an alternative employment of the method of FIG. 2.

Briefly stated, the invention contemplates an improved method of making fabric-lined journal bearings, of bore size determined by a mandrel. A piece of low-friction fabric material is cut from rectilinear stock, to such length between cut-off ends as to substantially equal the peripheral extent of the mandrel. A piece of bondable fabric is secured, as by sewing or clamping, to a cut-off end of the low-friction piece. The fabric composite, impregnated with hardenable material, is then wrapped onto the mandrel, beginning with the low-friction piece. The assembly is thereafter cured to hardness, and the mandrel removed.

FIG. 1 illustrates the kind of bearing produced by the methods of the invention. The bearing is a sleeve 10 having a bore 11 with inherent self-lubricating or low-friction properties determined by such properties in a fibrous element of an inner layer 12 of fabric. Outside of this layer 12 is a convolute development region 13 containing as many wrapped-up turns as desired of a different fabric which, for purposes of the invention, will merely be termed a fabric of bondable material, as for example, cotton-duck, linen, fiberglass, and the like. The solidity of the bearing is determined by an impregnation with hardenable material such as phenolic, epoxy or the like, and the sectioning for plastic for both regions 12–13 will be understood to apply for the employment of essentially a single body of hardening plastic permeating all layers of weave and cured to ultimate hardness.

In FIG. 2, I illustrate that the bearing 1 may be made in reference to a cylindrical mandrel 15 having a periphery precisely finished to determine the ultimate bore in the desired bearing. The low-friction material used in the inner layer 12 is in FIG. 2 a single rectangular piece 16 of suitable low-friction fabric. This piece 16 is intended for circumferential envelopment of the mandrel 15 and in accordance with the invention need be no longer than substantially this circumferential extent. The piece 16 may thus be cut from a bolt or other rectilinear piece of the fabric so as to define a length between cut-off edges 17 and 18 which represents substantially the periphery of the mandrel 15. The fabric 16 may be one of a variety of known materials. For example, it may be all of low-friction material, such as for example, a weave of all-Teflon, etched or otherwise treated, as desired for greater bondability. On the other hand, it may be a composite of Teflon and bondable or filler material wherein the filler materials are twisted with the Teflon to make the threads from which the fabric is woven, or wherein the fabric is double-woven to expose substantially only the Teflon threads at the inner face (i.e., at the bore 11) and the bondable threads at the outer face (i.e., adjacent the outer wrap-up layers 13).

The bondable material 19 in FIG. 2 may be as previously indicated and of width $w$ corresponding with the width of the piece 16. In FIG. 2, the corresponding edges of the low-friction material 16 and the bondable material 19 are secured by sewing together, as indicated by the stitching at 18.

To fabricate the illustrated bearing by the step in FIGURE 2, the composite cloth, i.e., the cloth of stitched pieces 16–19, is first soaked in liquid plastic material (which need only be called hardenable), and it is then laid upon the mandrel 15 to enable circumferential envelopment, as suggested by the almost completed turn of such development in FIG. 2. The mandrel 15 is then caused to rotate in the direction shown by the arrow, causing the seam at 18 to substantially match the outer edge 17; thereafter, the bondable material merely wraps in successive layers around the low-friction lining. This process is continued until the desired radial thickness of build-up is achieved, and preferably the lay-up is under tension so as to achieve a tight compaction of the fabric layers.

Upon completion of the desired radial build-up, the wrapped mandrel may be placed in a cylindrical mold (not shown) and the hardenable material subjected to a curing process, to the point of fully hardening the assembly. The wrapped mandrel may also be cured, without a mold, in an oven; such curing may be performed either with or without having first encased the wrapped mandrel in a vacuum bag. Use of the vacuum-bag technique achieves added pressure during the cure, and it also helps remove solvents such as would be required with polyimides. Heat-shrinkable plastic such as Mylar or nylon may also be employed to compress the wrapped mandrel during cure and post cure. After curing, the mandrel is released, release being facilitated by employment of a suitable parting agent as a coating prior to wrap-up.

In certain cases, it may be desired, alternatively, to impregnate the pieces 16 and 19 independently, and prior to stitching. Thus, the impregnant and the degree of impregnation may be optimized for the respective pieces 16–19. They can be stitched when their impregnants have dried and the fabrics are limp (B-stage cured). Final curing to C-stage may be accomplished, as described, after wrap-up on the mandrel.

FIG. 3 illustrates a modification wherein the ends 17'–18' of the low-friction piece 16' are first secured by sewing together so as to define a sleeve for full envelopment of and fit to the mandrel 15. In the process of sewing at 20 to achieve the sleeve construction, I indicate that the adjacent cut-off edge of the bondable material 19' be stitched at the same time.

The embodiment of FIG. 4 illustrates that the method of FIG. 3 lends itself to the ready employment of a layer of barrier material 21 interposed between the sleeve of low-friction material 16" and the first layer of wrap-up of the bondable material 19". Of course, the barrier material 21 may be pre-cut substantially to occupy the available circumferential extent between the respective sewn ends of the sleeve 16" (designated generally 22) and, once the rotation is strated for wrap-up of the bondable fabric over the low-friction fabric, the barrier layer is neatly sandwiched between. As before, convolute development continues until the full radial thickness is achieved.

The material of barrier layer 21 may be a woven fabric, an uncured plastic-soaked paper sheet, or heat-fusible material which cures faster or at a lower temperature than the fabric impregnant. The point of the barrier layer 21 is to impede flow of impregnant from the outer layers 13 to the inner layer 12 during the curing process, thereby assuring that the desired quantity of impregnant will remain in the inner layer 12, and "bleed through" to the bearing surface can be controlled or avoided, as desired.

FIG. 5 illustrates a method similar to those of FIGS. 3 and 4, in that both ends 17'''–18''' of the low-friction piece 16''' are the only sewn parts, defining a sleeve to fit the mandrel 15. Seam allowance at ends 17'''–18''' is adequate to permit folding of each end 17'''–18''' back on itself, away from stitching 20. However, I have found that the bondable material 19''' may be adequately secured to the low-friction sleeve if the inner edge 23 is first folded or crimped or creased and then pinched under the adjacent low-friction flap or seam allowance 18'''. This pinched relation should be held as bondable strip 19''' is wrapped around sleeve 16''' and into tightly drawn clamped relation over the seam of sleeve 16'''. Thereafter, tight application of successive turns merely enhance the tightly secured, clamped engagement of bondable material 19''' to the low-friction sleeve 16''', all the way from the initially clamped lead edge 23.

FIG. 6 illustrates a method of cut-off to desired length to provide journal bearings as needed from the basic elongated composite cured assembly, fabricated by one of the methods of FIGS. 2 to 5. This composite assembly is suggested at 25 as being chucked at 26 on a lathe. A first cut-off tool such as the boring tool 27 is positioned by its bar support 28 at the desired axial penetration within the bore of the assembly 25. At this location, the first phase of cut-off is achieved by radially outwardly displacement of the cut-off tool 27 to a radial extent $d$ at least as great as, and preferably slightly exceeding, the radial depth occupied by the low-friction layer 12. The cut-off tool 27 is shown as a broad V-shaped and will be appreciated as serving the purpose of defining ultimate bevel surfaces in the finished bearing. Such a bevel surface is shown at 29, and will be understood to have been formed during the previous cut-off operation on the piece of assembled stock 25. At 30, I schematically suggest the tool mounting to achieve this first stage of cut-off.

The second stage of cut-off is suggested by a tool 31 (and associated directional arrow) at the same axial location as that shown for the internal V-counterboring cut generated by tool 27; it is preferred that the thickness, width, or axial extent of the cut-off at 31 shall be substantially less than that of the V which is generated by tool 27. Such a relationship assures a substantial bevel 29 at each axial end of the cut-off pieces; such bevels, to the depth $d$ indicated, avoid or reduce the possibility of low-friction fibers such as Teflon fibers being exposed at the axial end planes of the cut-off bearing elements. As an alternative, a rotated fiber-glass cut-off wheel may be employed; in such case, the tool 31 identifies such wheel, and the boring tool 27 may be optional.

In FIG. 7, I illustrate a modification of the method of FIG. 2 wherein the pieces to be wrapped-up are cut on a bias. Thus, the low-friction piece 35 is of paralleologram shape for wrapping immediately adjacent the mandrel 15. The bias of the cut-off edges is shown to the extent D, corresponding to the circumferential extent of the mandrel 15. The slope of this bias will depend upon the ultimate length W of the assembly. Of course, the bias cut on the bondable material 36 should match that of the low-friction material to permit aligned lay-up of the successively wrapped layers. The stitching at 37 may be as described for FIG. 2. In a bearing made by this technique, the seam 37 is distributed axially and circumferentially, so that localized friction at particular angles is avoided.

It will be seen that the invention provides an improved bearing construction wherein not only may there be substantial manufacturing economy through use of the low-friction material only at the bearing surface, but a given supply of such low-friction material may be cut as needed to serve bearing production for a variety of bore sizes and outer-diameter sizes. The same cured tubular basic stock serves ultimate bearings of a variety of lengths, as called for by the customer. Furthermore, the use of separate low-friction stock 16 and bondable stock 19 permits optimized impregnation of each stock (16–19) and curing to dry limp form, prior to cut-off and stitching, without requiring a sewn composite strip 16–19 to be subjected to one and the same impregnant or degree of impregnation.

Although the invention has been described in connection with the preferred forms and methods, it will be understood that modifications may be made without departing from the scope of the invention as defined in the claims which follow.

What is claimed is:

1. The method of making a fabric-lined journal bearing having a bore determined by a mandrel, which comprises selecting from rectilinear stock a piece of low-friction fabric material having between cut-off ends an effective length to define one dimension substantially equal to the peripheral extent of the mandrel, selecting from rectilinear stock an elongated piece of bondable fabric material which is elongated by at least several times the effective length of said one dimension, whereby beginning with a first longitudinal end of said second piece a convolute wrap-up of the second piece may be achieved around the mandrel, securing said first longitudinal end to at least one of the ends of said first piece, impregnating at least one of said pieces with hardenable material, wrapping the composite two pieces around the mandrel with said low-friction piece in contact with the mandrel, curing to hardness the hardenable material of the wrapped-up assembly, and then removing the mandrel.

2. The method of claim 1, in which adjacent single ends of said pieces are sewn to make a single elongated composite piece with said low-friction piece extending from one end of said bondable piece.

3. The method of claim 1, in which the two ends of said low-friction piece are sewn together to make a sleeve to receive the mandrel by endwise insertion.

4. The method of claim 3, in which the sewing which stitches together the ends of said low-friction piece also stitches said first end of the bondable piece thereto.

5. The method of claim 3, in which a seam allowance is provided at the stitching near said ends, thereby defining a flap of low-friction material at the seam, inserting said first longitudinal end of said second piece between said flap and sleeve, the wrapping being tensed to clamp said flap and said first longitudinal end against said sleeve as wrap-up proceeds.

6. The method of claim 1, in which said low-friction piece is of a rectangular shape with said one dimension effectively defining one of the sides of the rectangle.

7. The method of claim 1, in which said low-friction piece is of parallelogram shape with the cut-off ends thereof on a bias with respect to the width dimension, the first longitudinal end of said bondable piece being similarly biased.

8. The method of claim 7, in which the extent of the bias is such as to establish along the mandrel substantially a full circumferential convolute development of the biased ends of the low-friction piece.

9. The method of claim 1, in which cut-off to form an ultimate product of desired axial length shorter than the mandrel wrap-up is achieved by first radially outwardly counterboring said assembly to a radial extent at least as great as the radial thickness occupied by the low-friction piece.

10. The method of claim 9, in which cut-off thereafter proceeds by a radially inward cut at the axial location of the counterbore.

11. The method of claim 9, in which the counterbore cut is V-profile, and in which the radially inward cut is of substantially lesser axial extent than that of the V-cut, whereby such counterbore cuts define beveled ends of the bores of bearings successively cut from said assembly, the bevels eliminating exposure of low-friction fibers at the axial end planes of the cut-off bearings.

12. The method of claim 1, in which said pieces are impregnated prior to sewing, whereby the impregnant and degree of impregnation may be optimized for each particular piece.

13. The method of claim 1, in which a layer of barrier material is inserted intermediate the first piece and the surrounding wrap of said second piece.

14. The method of making a fabric-lined journal bearing having a bore determined by a mandrel, which comprises selecting from rectilinear stock a piece of low-friction fabric material having between cut-off ends an effective length to define one dimension slightly greater than the peripheral extent of the mandrel, stitching the cut-off ends with a seam allowance to define an elongated flap, selecting from rectilinear stock an elongated piece of bondable fabric material which is elongated by at least several times the effective length of said one dimension, inserting said first longitudinal end of said second piece between said flap and sleeve, pinching said inserted end between said flap and sleeve, wrapping said bondable piece under tension around said sleeve, and curing to hardness a hardenable material in impregnated relation with said pieces.

15. The method of claim 14, in which said first longitudinal end is crimped back on itself at the location of insertion and clamping.

References Cited

UNITED STATES PATENTS

| | | | |
|---|---|---|---|
| 2,958,927 | 11/1960 | Kravats | 29—149.5 |
| 3,235,941 | 2/1966 | Krotz | 29—149.5 |
| 3,238,601 | 3/1966 | White | 308—238 X |

THOMAS H. EAGER, Primary Examiner

U.S. Cl. X.R.

29—419